Nov. 8, 1932. P. KRAFT 1,887,099
DEVICE PROVIDING DIFFERENTLY COLORED ILLUMINATION FOR MICROSCOPIC OBJECTS
Filed March 20, 1931
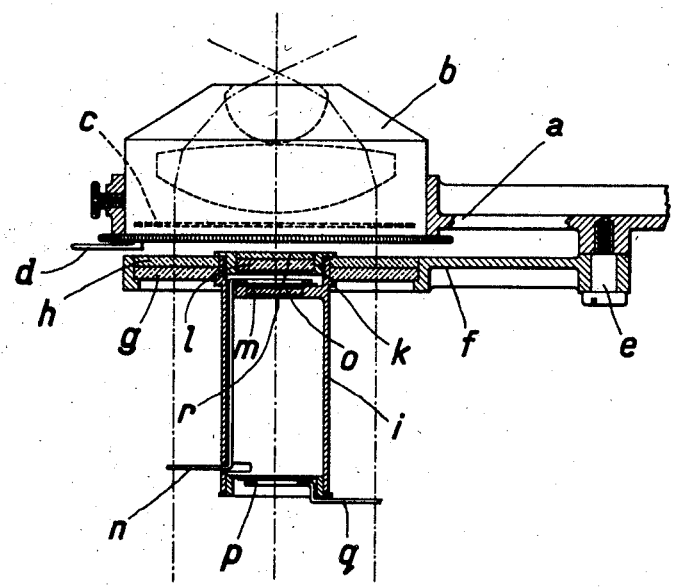
Inventor:
Paul Kraft.

UNITED STATES PATENT OFFICE

PAUL KRAFT, OF JENA, GERMANY, ASSIGNOR TO THE FIRM CARL ZEISS, OF JENA, GERMANY

DEVICE PROVIDING DIFFERENTLY COLORED ILLUMINATION FOR MICROSCOPIC OBJECTS

Application filed March 20, 1931, Serial No. 524,106, and in Germany March 24, 1930.

Transparent microscopic images, which cannot be distinctly seen in the microscope, are usually made visible by means of pigments. Setting aside this chemical coloring of the objects, which in most cases kills the living organisms, the suggestion has been made to use optical coloring methods that do not influence the vitality of the objects and according to which a condenser with adjustable diaphragm directs to the object pencils of illuminating rays which have previously passed filters transparent to differently colored light. The whole light pencil directed to the condenser was mostly divided in a central and an exterior part, and the light of this exterior part was sometimes subdivided into several partial differently colored ray pencils allowing to alter their azimuth as well as their inclination relative to the axis of the microscope objective used in the observation. According to the experimental arrangement the condenser worked in such a manner that the object was subject either to a complete light or to a complete dark field illumination or to a mixture of both.

The results obtained with tests made according to these suggestions could however satisfy only moderate demands. The reason therefore is that, with respect to their effect, the light pencils of different colors have to be very finely toned relatively to each other so as to permit of obtaining a most favourable effect, which is superior to the ordinary dark field illumination with white light. This toning which hitherto has not been sufficiently taken into consideration varies with different inclinations of the ray pencils especially when a change is made between light field illumination, dark field illumination or a mixture of both.

The object of the present invention is to improve the optical coloring method. The invention consists in a device of the said kind for obtaining different chromatical effects in the illumination of microscopic objects, which, according to the invention, has in the central part of the pencil of illuminating rays, and in front of the color filter, two adjustable diaphragms. Between these diaphragms, immediately in front of the second diaphragm, is provided a dispersing filter. The first diaphragm serves for reducing the intrinsic brilliancy of the illuminated dispersing filter and the second for reducing the effective aperture of the dispersing filter.

The central pencil of illuminating rays therefore takes the following way. The first of the diaphragms is illuminated by dispersed daylight or by an artificial light source. The pencil passing the diaphragm aperture is diverging and this also in the case of an artificial light source disposed approximately in the focus of an illumination lens. The divergence of the pencil is based upon the fact that the artificial light sources have practically always a certain extension, that is to say that they are not exactly punctiform, and that a frosted disc, which as a rule acts as a diverging filter, is disposed behind the light source. Provided the two diaphragms are given a suitable mutual distance, the diverging filter lying immediately in front of the second diaphragm, owing to the divergence, is uniformly illuminated over its whole extension with an intrinsic brilliancy which depends on the aperture of the first diaphragm, but also approximately uniformly when the diaphragm aperture is narrow. The diverging filter acts as the real light source for the central pencil; its aperture is constricted by narrowing down the aperture diameter of the second diaphragm lying near it. Using only this second diaphragm instead of both diaphragms is not admissible with a somewhat bright light source because the sometimes necessary use of a very narrow diaphragm aperture might allow diffractions of the light and thus impair the quality of the image in the microscope. On the other hand, a device in which the first diaphragm is replaced by a fumed glass or the like which, together with the second diaphragm, influences the central partial pencil in the sense of weakening the light would not allow of obtaining sufficiently brilliant images. The pencil passes in this case the central color filter in order to be finally directed by the condenser to the object.

Contrary thereto, the exterior pencil of illuminating rays passes directly the color filter provided in its ray path; for regulating its brilliancy serves the diaphragm disposed at the condenser. By stopping down the pencil from the exterior edge this diaphragm acts in the case of catoptric condensers with an even number of reflexions and in the case of dioptric condensers as an aperture diaphragm, whereas for example with the paraboloid condenser which reflects the rays only once it only reduces the intrinsic brilliancy by stopping down the leaving pencil from the central edge.

The device can be further improved by making the light transparency of the color filters variable by exchangeable additional filters of fumed glass or the like.

The accompanying drawing shows a constructional example of the invention in a central section in front elevation.

In the condenser support $a$ of any microscope is inserted in the well-known manner a two-lens light field condenser $b$. For constricting its aperture this condenser $b$ is provided with an iris diaphragm $c$ whose diaphragm aperture can be altered by means of a lever $d$. At the lower side of the condenser support $a$ a filter support $f$ is pivotally provided by means of a screw $e$. In the filter support $f$ are inserted a ring-shaped red filter $g$ and a smoked glass $h$ of equal size. The ring aperture of these light filters comprises a tube $i$ which can be fixed by means of a threaded ring $k$ which serves at the same time as a mount for a blue filter $l$. Directly beneath the blue filter $l$, in the tube $i$, is disposed an iris diaphragm $m$ which can be adjusted by means of a lever $n$ and whose diaphragm plane is closely above a dispersing filter $o$ of frosted glass absorbing the ultraviolet rays. At the lower end of the tube $i$ is an iris diaphragm $p$ having an adjusting lever $q$. If required, also the central color filter $l$ may be supplemented by an additional fumed glass filter $r$.

When using the device care must be taken that those light rays which pass the two filters $g$ and $h$ leave the condenser $b$ with such an inclination relative to the condenser axis that they pass outside the front lens of the just used microscope objective and that here only light diffracted in the object is allowed to pass. However, if the inclination of part of these leaving rays is too slight, the corresponding part of the pencil is to be stopped down by exchanging the threaded ring $k$ for a ring having a bigger flange or by stopping the light down by placing on the threaded ring $k$ a diaphragm ring of corresponding size. As soon as this condition is met, and when the axes of the tube $i$ and the condenser $b$ coincide, the light filtered in the parts $g$ and $h$ is sure to produce only a pure dark field illumination of the object, the brilliancy of which can be altered by exchanging the fumed glass ring $h$ for a ring of another transparency and by adjusting the stop $c$ by means of the lever $d$.

Those illuminating rays which pass the blue filter $l$ leave the condenser $b$ under such inclinations relative to the optical axis of this condenser which do not prevent their entrance into the front lens of any microscope objective. When the axes of the tube $i$ and the condenser $b$ coincide, the light filtered in the part $l$ provides a light field illumination of the object. The free apertures of the diaphragms $m$ and $p$ are altered by adjusting the levers $n$ and $q$, and the light field illumination is thus toned relatively to the dark field illumination, which is produced by the exterior pencil of illuminating rays, in such a manner that the just used light source provides the most favorable illumination of the object. Also in the case of a very brilliant light source emitting a great quantity of ultraviolet rays, owing to the light being strongly subdued by the diaphragms $m$ and $p$ and to the absorbing effect of the dispersing filter $o$, the observer need not fear any detrimental effect when having to work with the illumination device during a protracted period.

If so required, the filters $g$ and $l$ may be substituted also by such filters which are transparent for different colors in different azimuths. In this case the azimuth of the different colors can be altered by turning the tube $i$, and the filters $g$ and $l$, about its axis in the filter support $f$. Observations can be made also with oblique illumination when the filter support $f$ is turned out of the position shown in the drawing about the screw bolt $e$ over a certain angle.

I claim:

1. A device providing differently colored illumination for microscopic objects, comprising a condenser, a diaphragm with adjustable aperture connected to the condenser, a color filter disposed in the exterior part of the condenser aperture, a color filter of different color provided in the central part of the condenser, two diaphragms with adjustable aperture disposed in front of the central color filter, and a dispersing filter inserted between the last said two diaphragms and directly in front of that of these two diaphrams which faces the central color filter.

2. In a device according to claim 1 two interchangeable filters of smoked glass being added to the said two color filters.

PAUL KRAFT.